E. LETORD.
CONNECTING MEMBER FOR ASSEMBLING AND MOUNTING AEROPLANE PARTS.
APPLICATION FILED NOV. 13, 1917.
1,315,561.
Patented Sept. 9, 1919.
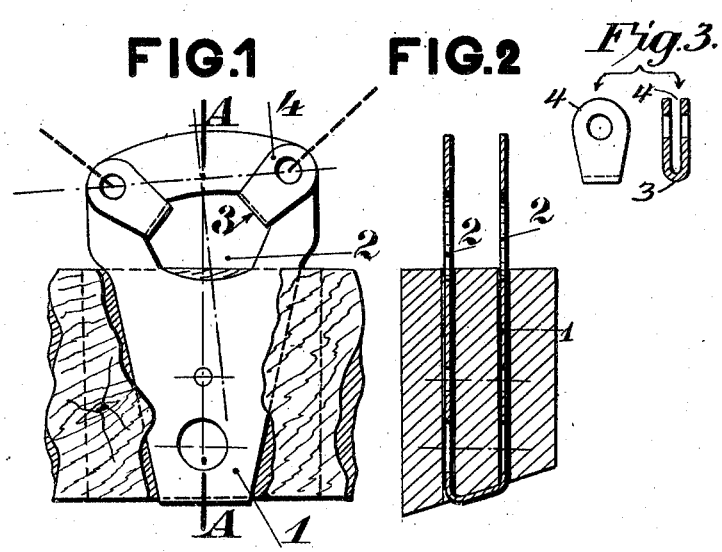
Witnesses
Inventor

UNITED STATES PATENT OFFICE.

EMILE LETORD, OF MEUDON, FRANCE.

CONNECTING MEMBER FOR ASSEMBLING AND MOUNTING AEROPLANE PARTS.

1,315,561.  Specification of Letters Patent.  Patented Sept. 9, 1919.

Application filed November 13, 1917. Serial No. 201,843.

*To all whom it may concern:*

Be it known that I, EMILE LETORD, a citizen of the French Republic, residing at Meudon, Seine-et-Oise, France, have invented certain new or useful Improvements in Connecting Members for Assembling and Mounting Aeroplane Parts, of which the following is a specification.

This invention relates to a connecting member for securing the uprights connecting the upper and lower wings of a biplane flying machine to the longitudinal bars of said wings, and is designed to allow of attaching the bracing wires on the said longitudinal bars without having to use bolts.

Figure 1 shows the connecting member in elevation.

Fig. 2 is a section through A—A of Fig. 1.

Fig. 3 is a detail view.

The connecting member is composed of a U-shaped coupling plate 1 inserted and extending through a double slot 5 in the longitudinal bar and having apertures 2 at its upper part, the corners of which are shaped to a given angle in order to receive the bases 3 of U-shaped clips 4 engaging in the aperture 2 and embracing portions of the coupling plate 1. The fork-shaped ends of the coupling screws of the bracing wires clasp the cheeks of the clips, and a single bolt passing through registering perforations in the fork-shaped ends of the coupling screws, clip and coupling plate keeps the whole in fixed position. The clips are easily dismountable and strengthen the coupling plate at the places where the bracing wires are attached. Their super-thickness keeps the upright in the lateral direction and it is maintained on the connecting members by the compressions of the bracing wires and by a slot in which the wings of the connecting member are housed.

What I claim as my invention and desire to secure by Letters Patent of the United States is:—

A connecting member for fixing uprights and wire braces between the wings of a biplane flying machine, comprising a U-shaped coupling plate adapted to engage a horizontal bar of a wing and provided with an aperture whose corners are shaped to a given angle, and U-shaped clips engaging in said aperture and fitting said shaped corners thereof, whereby said clips embrace portions of said coupling plate, said clips and the embraced portions of said plate having registering perforations for the purpose set forth.

In witness whereof I have signed this specification in the presence of two witnesses.

EMILE LETORD.

Witnesses:
 JEAN GERMAIN,
 MARIN VACHON.

Copies of this patent may be obtained for five cents each, by addressing the "Commissioner of Patents, Washington, D. C."